(12) United States Patent
Huang et al.

(10) Patent No.: US 7,460,313 B1
(45) Date of Patent: Dec. 2, 2008

(54) ZOOM LENS STRUCTURE

(75) Inventors: Chunru Huang, Taipei (TW);
Chien-Yueh Chen, Taipei (TW)

(73) Assignee: AV Tech Corporation, Taipei County (TW)

( * ) Notice: Subject to any disclaimer, the term of this patent is extended or adjusted under 35 U.S.C. 154(b) by 0 days.

(21) Appl. No.: 11/751,826

(22) Filed: May 22, 2007

(51) Int. Cl.
*G02B 15/14* (2006.01)
(52) U.S. Cl. .................. 359/696; 359/701; 359/704
(58) Field of Classification Search ......... 351/694–704, 351/819–825, 829, 830
See application file for complete search history.

(56) References Cited

U.S. PATENT DOCUMENTS

| | | | |
|---|---|---|---|
| 6,606,206 B2 * | 8/2003 | Takeshita et al. | 359/704 |
| 6,934,096 B1 * | 8/2005 | Takeshita et al. | 359/819 |
| 7,016,123 B2 * | 3/2006 | Yano | 359/697 |
| 7,133,216 B2 * | 11/2006 | Takeshita et al. | 359/704 |
| 7,199,945 B2 * | 4/2007 | Tsuzuki | 359/701 |

* cited by examiner

*Primary Examiner*—Mohammed Hasan
(74) *Attorney, Agent, or Firm*—Rosenberg, Klein & Lee

(57) ABSTRACT

The present invention discloses a zooming lens structure comprising at least a fixed lens barrel, an diaphragm member, a front track lens barrel, a rear track lens barrel, a front lens barrel module and a rear lens barrel module, wherein the first guide screw cylinder of the front lens barrel module is driven through geometric correlation of the first guide slot of the fixed lens barrel and the first track of the front track lens barrel to enable the front lens barrel module to shift within the fixed lens barrel; again, the second guide screw cylinder of the rear lens barrel module is driven through geometric correlation of the second guide slot of the fixed lens barrel and the second track of the rear track lens barrel to enable the rear lens barrel module to shift within the fixed lens barrel, and since the screw bolt locks the front and rear track lens barrel, the front and rear track lens barrels rotate simultaneously, and the first guide screw cylinder and the second guide screw cylinder then are simultaneously driven to achieve zooming effect.

15 Claims, 7 Drawing Sheets

ZOOM LENS STRUCTURE

BACKGROUND OF THE INVENTION

1. Field of the Invention

The present invention relates to a zoom lens structure, and more particularly to utilize a screw bolt for fastening the front and the rear track lens barrels and allow the front and rear lens groups to be effectively shifted in association with only a single driving source through interaction of the tracks and guiding grooves.

2. Description of the Prior Art

Referring to FIG. 1 for a conventional zoom lens structure, the zoom lens structure comprises at least a first lens group 11, a second lens group 12, a fastening ring 13, a cylindrical cam barrel 14, an external barrel 15 and a driving gear wheel 16, wherein the first lens group 11 has a positioning slice 111 and a pulley 112; and the second lens group 12 has a positioning groove 121 and the pulley 112, and the fastening ring 13 has a positioning slab 131 and a protrusion 132; the cyclindrical cam barrel 14 has multiple male threads 141, gear tooth 142 and curve grooves 143; the external barrel 15 has straight line grooves 151, multiple female threads 152 and a long slot 153. From this diagram, the positioning slice 111 of the first lens group 11 is disposed on the positioning groove 121 of the second lens group 12, and the positioning slab 131 of the fastening ring 13 is also disposed to the positioning groove 121 of the second lens group 12; and the first lens group 11, the second lens group 12 and the fastening ring 13 may not produce relative displacement through the positioning slice 111, the positioning slab 131 and the positioning groove 121; and the first lens group 11 and the second lens group 12 are disposed inside the cylindrical cam barrel 14 and the pulley 112 of the first lens group 11 and the pulley 112 of the second lens group 12 are disposed to the curve groove 143. The cylindrical cam barrel 14 then is disposed inside the external barrel 15 so that the multiple male threads 141 of the cylindrical cam barrel 14 and the multiple female threads 152 of the external barrel 15 may contact with each other, and the protrusion 132 of the fastening ring 13 will also be disposed to the straight line groove 151 of the external barrel 15. The cylindrical cam barrel 14 then is driven for rotation through the driving gear wheel 16 disposed to the long slot 153 of the external barrel 15, and because of the interaction of the multiple female threads 152 of the external barrel and the multiple male threads 141 of the cylindrical cam barrel 14, the cylindrical cam barrel 14 can be stretched out from the external barrel 15 so that the first lens group 11 and the second lens group 12 then are further stretched out from the cylindrical cam barrel 14 to achieve the zooming effect.

However, the first lens group 11 and the second lens group 12 can only shift within a narrow range provided by the zoom lens structure, thus resulting in highly restricting the zooming effect. To enhance the zooming effect, researchers seek to lengthen the two lens groups to provide sufficient zooming distance. But this requires two driving sources for control, and the entire volume is increased.

To satisfy the requirement for better zooming effect through one driving source, the inventor of the present invention, with years of research and practical experience of the industry, has presented this zoom lens structure.

SUMMARY OF THE INVENTION

In view of the above issue, an objective of the present invention is to provide a zoom lens structure that utilizes a screw bolt for fastening the front and the rear track lens barrels and allows the front and rear lens groups to be effectively shifted in association with only a single driving source through interaction of the tracks and guiding grooves so as to achieve the zooming.

To accomplish the aforementioned objective, the zoom lens structure of the present invention comprises at least a fixed lens barrel, a diaphragm member, a front track lens barrel, a rear track lens barrel, a front lens barrel module and a rear lens barrel module, wherein the fixed lens barrel has a front lens barrel end and a rear lens barrel end; the front lens barrel end has at least a first guide slot and a diaphragm aperture and the diaphragm aperture is provided for fastening the diaphragm member. The rear lens barrel end has at least a second guide slot, wherein the diaphragm member is generally an iris diaphragm module with an iris diaphragm and a motor. The front track lens barrel has a barrel body, a driven gear and a rear end ring, and the barrel body has at least a first track and the rear end ring has at least a zooming fixed screw hole, and the driven gear with a minor arc shape is used to connect the barrel body and the rear end ring; the rear track lens barrel has a second track and a fixed screw hole, and a screw bolt is used to lock the front track lens barrel and the rear track lens barrel through the zooming fixed screw hole and the fixed screw hole. The fixed lens barrel, the front track lens barrel and the rear track lens barrel can produce relative rotation. The front lens barrel module has a front lens barrel, a first guide screw cylinder and a front lens group. The rear lens barrel module has a rear lens barrel, a second guide screw cylinder and a rear lens group. The front lens barrel module and the rear lens barrel module can be fastened in the fixed lens barrel through the first and the second guide screw cylinders, and shift within the rear track lens barrel and the rear track lens barrel respectively.

The zooming fixed screw hole and the fixed screw hole are used to adjust the relative displacement of the first guide screw cylinder and the front lens barrel module relative to the second guide screw knob and the rear lens barrel module when the rear track lens barrel and the front track lens barrel relatively rotate; and after adjusting the front lens barrel module and the rear lens barrel module to the relative positions with a clear focus, the screw bolt is used to fasten the zooming fixed screw hole and the fixed screw hole. Such design has the function of using the track to adjust the relative position of the front lens barrel module and the rear lens barrel module even if the first guide screw cylinder and the second guide screw cylinder of the front lens barrel module and the rear lens barrel module have slight errors while in manufacture. Therefore, clear focusing is obtainable In accordance with the zoom lens structure of the present invention, the front lens barrel module and the rear lens barrel module are respectively installed to the front lens barrel end and the rear lens barrel end of the fixed lens barrel, and the front track lens barrel is disposed to the front lens barrel end of the fixed lens barrel, and the rear track lens barrel is disposed to the rear lens barrel end of the fixed lens barrel, and the first screw cylinder installed to the front lens barrel shifts along the first track and the first guide slot, and the second screw cylinder installed to the rear lens barrel shifts along the second track and the second guide slot, and a screw bolt then is used to lock the front track lens barrel and the rear track lens barrel. When the driving motor drives the driven gear of the front track lens barrel through a gear wheel to enable the front track lens barrel to rotate, the fixed lens barrel is maintained in a immovable status since the diaphragm member is fixed to the diaphragm slot of the fixed lens barrel. The first guide screw cylinder accommodated to the first track is pushed to produce displacement through the interaction of the first guide slot of the fixed lens barrel and the first track of the front track lens barrel, and the front lens barrel module is further driven to produce displacement. The second guide screw cylinder accommodated to the second track is pushed to produce displacement through interaction of the second guide slot of the fixed lens barrel and the second track of the rear track lens barrel, and the rear lens barrel module is also driven to produce displacement opposite the front lens barrel module. The front and the rear lens groups are driven through a driving source to achieve the zooming.

To make it easier for our examiner to understand the above objectives, and the technology used and functions achieved, the following feasible preferred embodiment accompanied with the related drawings are described in details.

DETAILED DESCRIPTION OF THE PREFERRED EMBODIMENT

Below is a preferred embodiment of a zoom lens structure in accordance with the present invention. To make it easier to understand, the component numerals used in the preferred embodiment here are the same as the component numerals used in the previous preferred embodiment.

Figure 1:
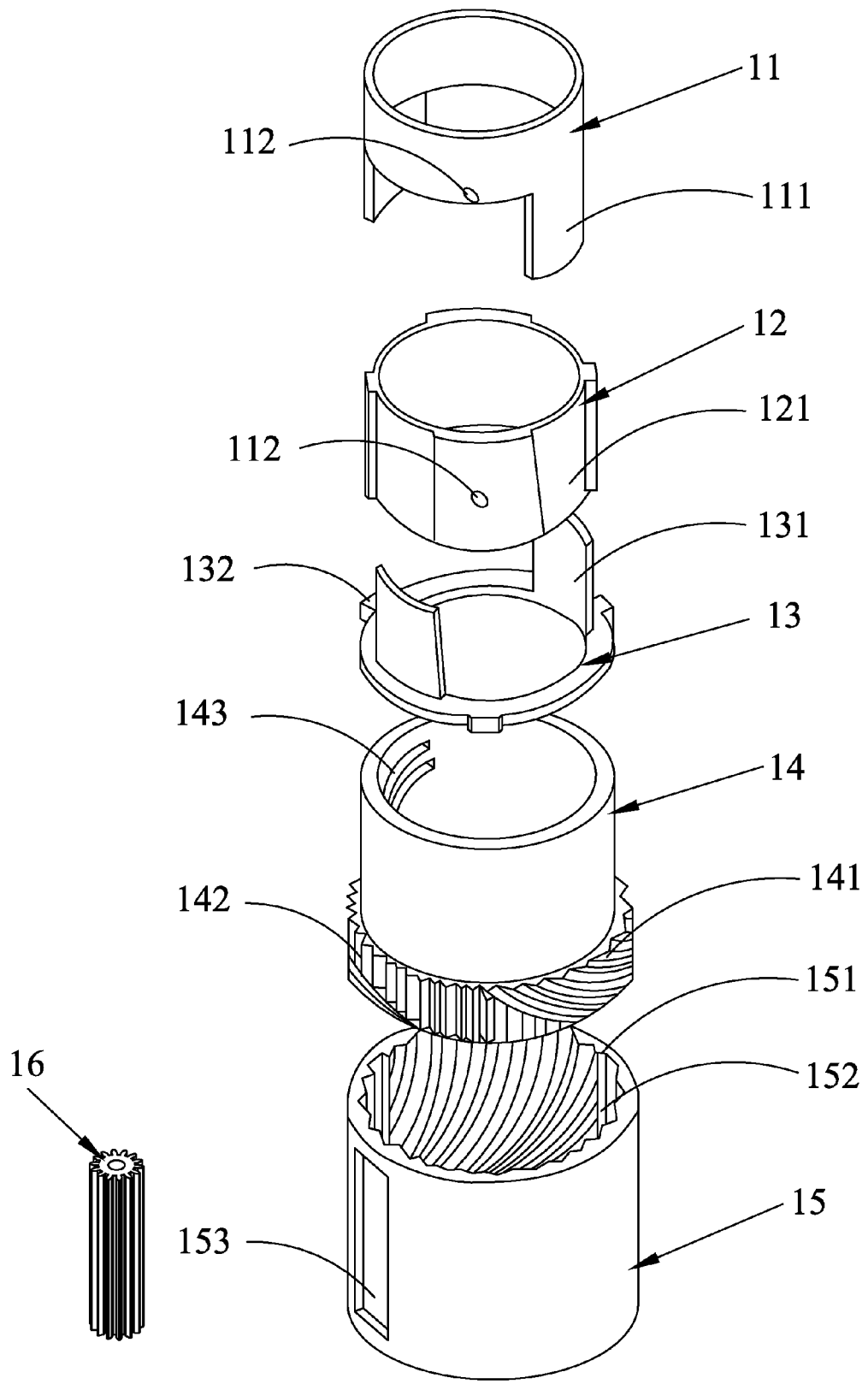
FIG. 1 is an exploded perspective view of a conventional zooming lens structure.
Figure 2:
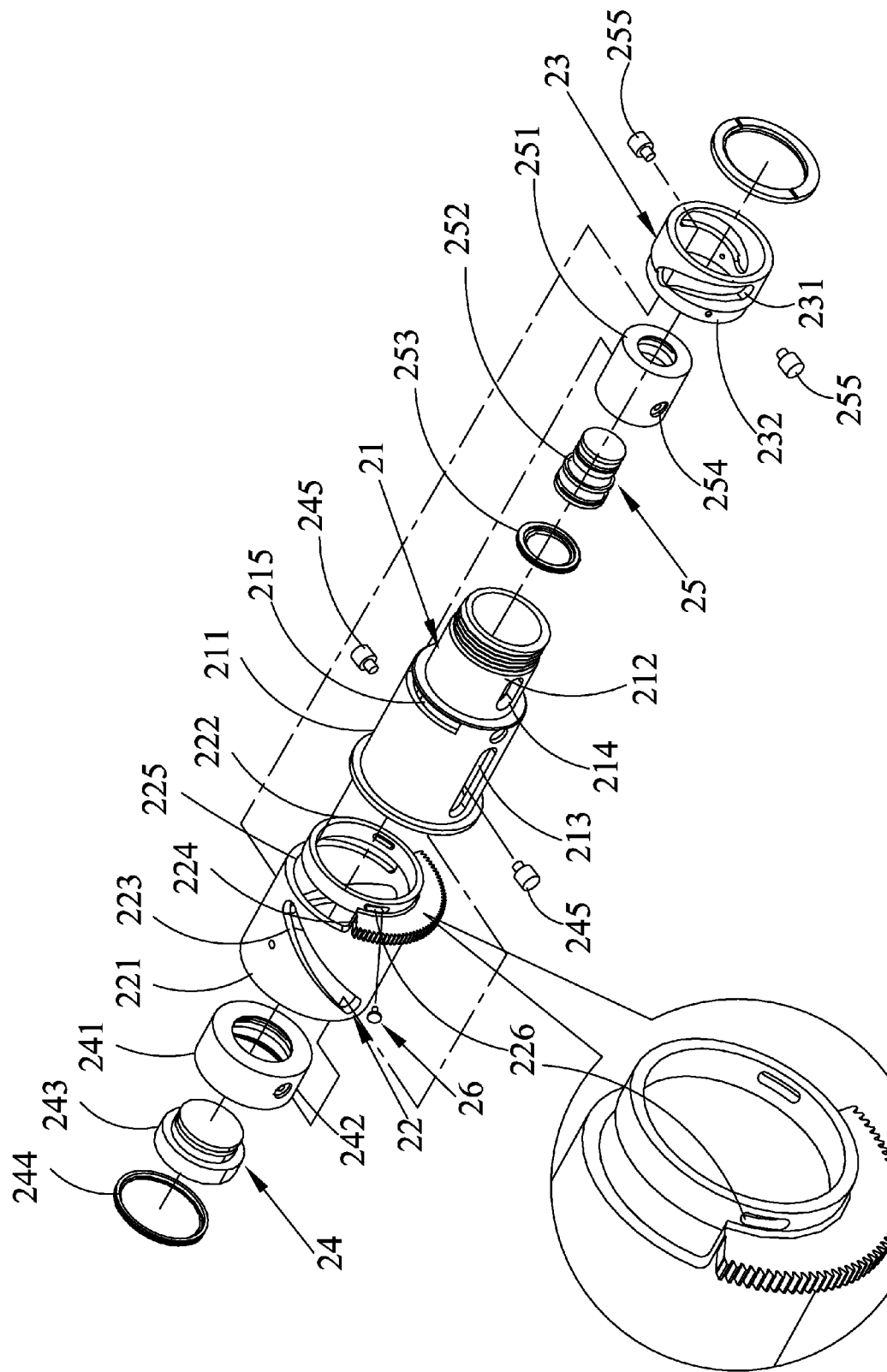
FIG. 2 is an exploded perspective view of a zooming lens structure in accordance with the present invention.
Figure 3:
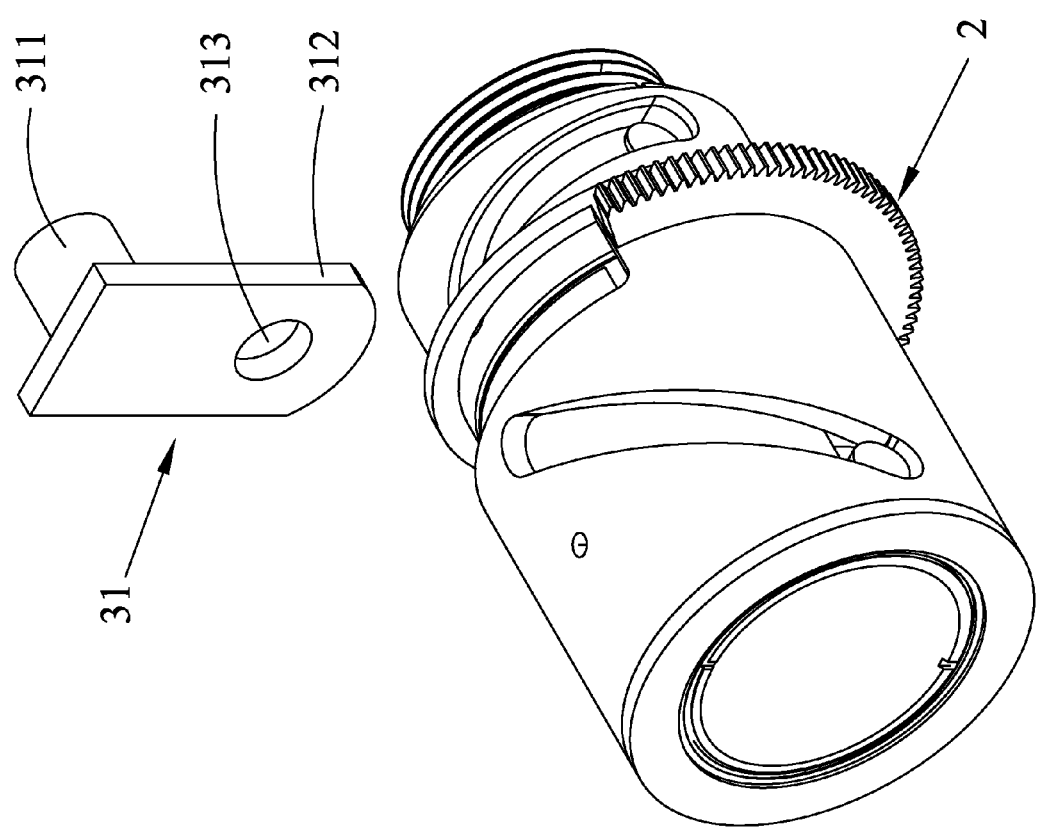
FIG. 3 is a disassembled perspective view of a zooming lens structure and a variable diaphragm module in accordance with the present invention.

Referring to FIGS. 2 and 3, FIG. 2 is an exploded perspective view of a zoom lens structure in accordance with the present invention and FIG. 3 is a disassembled perspective view of a zoom lens structure and a variable diaphragm module in accordance with the present invention. FIG. 2 shows that the zoom lens structure comprises at least a fixed lens barrel 21, a front track lens barrel 22, a rear track lens barrel 23, a front lens barrel module 24 and a rear lens barrel module 25, wherein the fixed lens barrel 21 has a front lens barrel end 211 and a rear lens barrel end 212. Two sides of the front lens barrel end 211 has first guide slots 213 and a diaphragm aperture 215, wherein the length of the diaphragm aperture 215 is equal to the width of the iris diaphragm 311 so that the iris diaphragm 311 and the diaphragm aperture 215 may not produce relative displacement; and both sides of the rear lens barrel end 212 have a second guide slot 214, wherein the diameter of the front lens barrel end 211 is larger than the diameter of the rear lens barrel end 212; and the front track lens barrel 22 has a barrel body 221 and a rear end ring 222, and the barrel body 221 has two corresponding first tracks 223 surrounding the barrel body 221; the rear end ring 222 has two zooming fixed screw holes 226. The barrel body 221 and rear end ring 222 are connected by a driven gear 224 with a minor arc shape, and a major arc shaped diaphragm slot 225 is formed to connect with the driven gear 224 where the diameter of the rear end ring 222 is smaller than the diameter of the barrel body 221; the rear track lens barrel 23 has two corresponding second tracks 231 surrounding the rear track lens barrel 23, and has a zooming fixed screw hole 226 at the bottom corresponding to the fixed screw hole 232. A screw bolt 26 is used to lock the zooming fixed screw hole 226 and the fixed screw hole 232 so that the front track lens barrel 22 and the rear track lens barrel 23 can move simultaneously, and because the zooming fixed screw hole 226 is a long slot, before locking the front track lens barrel 22 and the rear track lens barrel 23, adjustment can be made for the relative positions of the front lens group 243 in the front track lens barrel 22 and the rear lens group 251 in the rear track lens barrel 23 so that the front lens barrel module 24 and the rear lens barrel module 25 can achieve an optimum focus; the front lens barrel module 24 has a front barrel 241, a front lens group 243 and two first screw cylinders 245, and the front barrel 241 is used to accommodate the front lens group 243 and a fixed ring 244 fastens the front lens group 243 without coming off from the front barrel 241; further, two first screw cylinders 245 pass through the first guide slot 213 and the first track 223, and then are fastened to the screw holes 242 on both sides of the front barrel 241; the rear lens barrel module 25 has a rear barrel 251, a rear lens group 252 and two second screw cylinders 255 where the rear barrel 251 is used to accommodate the rear lens group 252 and a fixed ring 253 fastens the rear lens group 252 without coming off from the rear barrel 251, and again two second screw cylinders 255 pass through the second guide slot 214 and the second track 231, and are fastened to the screw holes 254 on both sides of the rear barrel 251. In FIG. 3, the iris diaphragm module 31 has a diaphragm member with an iris diaphragm 311 and a motor 312, and the iris diaphragm 311 has an opening 313, and the iris diaphragm module 31 has a plurality of blades (not shown in the diagram) installed in the opening 313; the motor 312 controls the blades and adjusts the size of the opening 313 to control the amount of light rays entering, and the iris diaphragm 311 of the iris diaphragm module 31 passes through the diaphragm slot 225 and is installed in the diaphragm aperture 215 to combine the iris diaphragm module 31 with the fixed lens barrel 21.

Figure 4:
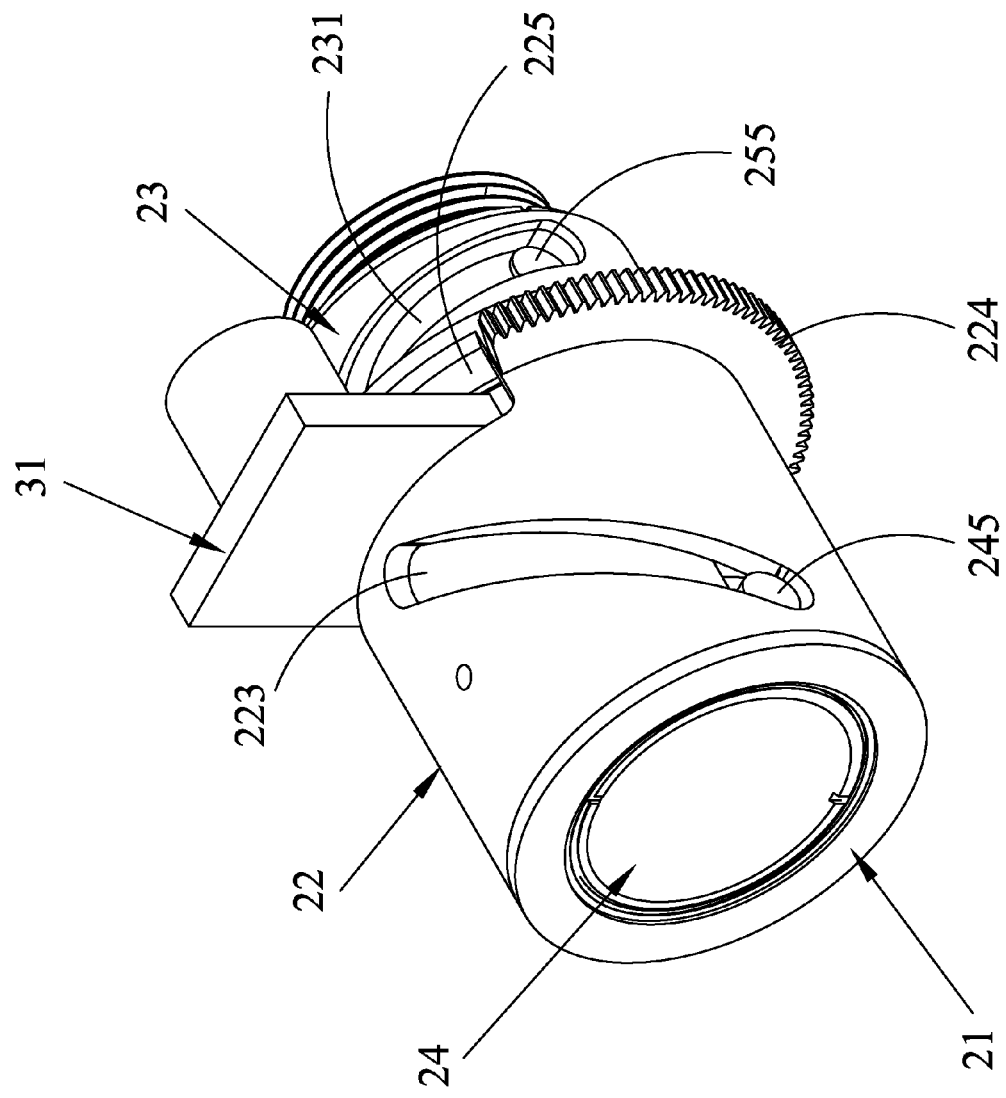
FIG. 4 is a schematic view of the present invention.
Figure 5:
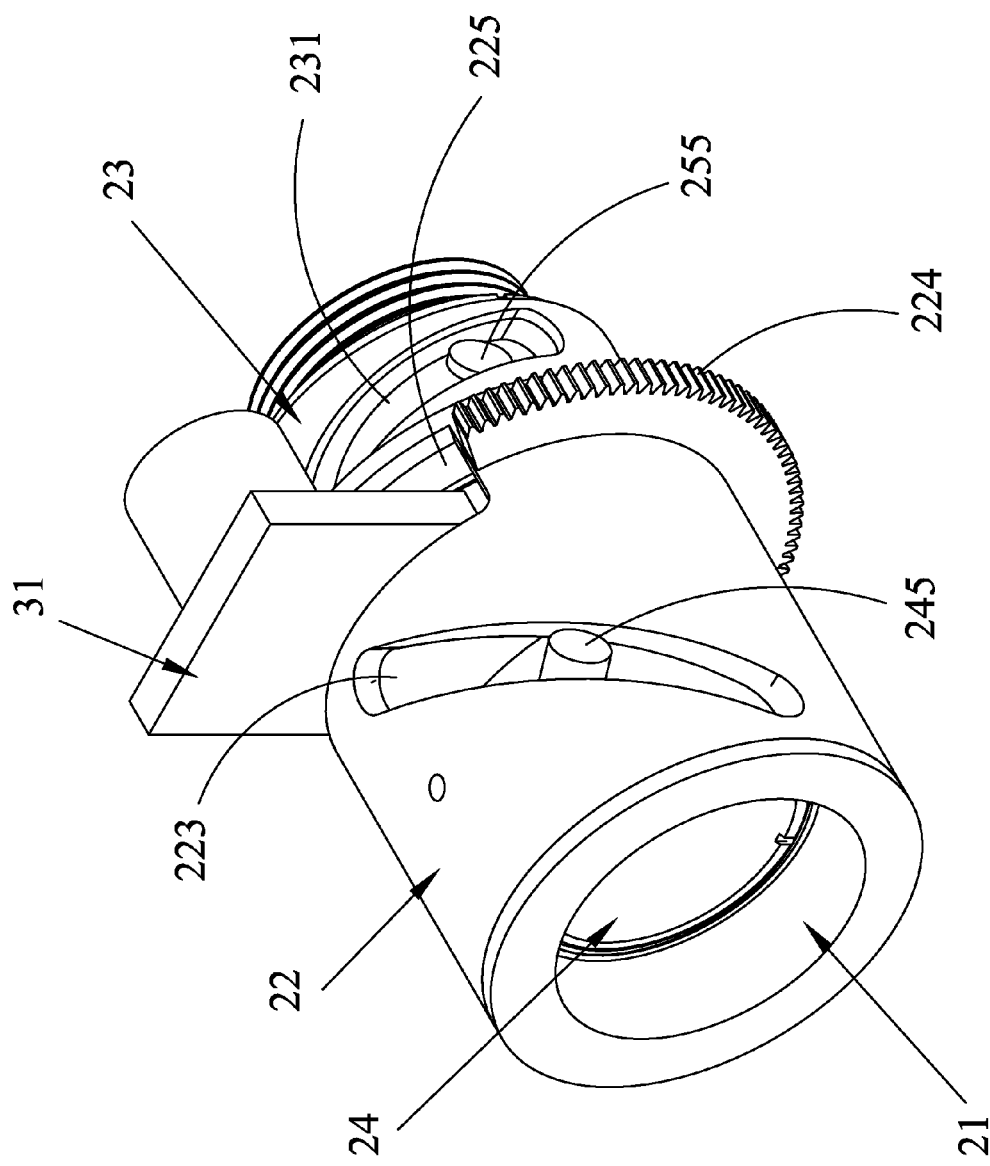
FIG. 5 is a schematic view of the present invention in action.

Referring to FIGS. 4 and 5, where FIG. 4 is a schematic view of the present invention, and FIG. 5 is a schematic view of the present invention in action. In FIG. 4, the first guide screw cylinder 245 is restricted to the first guide slot 213 (refer to FIG. 2) and the first track 223 of the fixed lens barrel 21, and the second guide screw knob 255 is restricted to the second guide slot 214 (refer to FIG. 2) and the second track 231 of the fixed lens barrel 21; and the iris diaphragm module 31 passes through the diaphragm slot 225 of the front track lens barrel 22 and the diaphragm aperture 215 (refer to FIG. 2) of the fixed lens barrel 22 and is also combined with the fixed lens barrel 22. Refer to FIG. 5, when in action, the driving motor (not shown in the diagram) drives the driven gear 224 and the front track lens barrel 22 and the coupled rear track lens barrel 23 are also driven for rotation. The major arc shaped diaphragm slot 225 can keep the iris diaphragm module 31 and the coupled fixed lens barrel 21 immovable, and the first guide screw cylinder 245 is restricted by the first guide slot 213 and the first track 223 and results in frontward and rearward action, and the second guide screw cylinder 255 is restricted by the second guide slot 214 and the second track 231 and results in frontward and rearward action; further, since the first track 223 and the second track 231 are in reverse directions, the first guide screw cylinder 245 and the second guide screw cylinder 255 either moves closer or further away so that the front lens barrel module 24 connected to the first guide screw cylinder 245 and the rear lens module 25 (refer to FIG. 2) connected to the second guide screw cylinder 255 are also driven to achieve the zooming effect.

Figure 6:
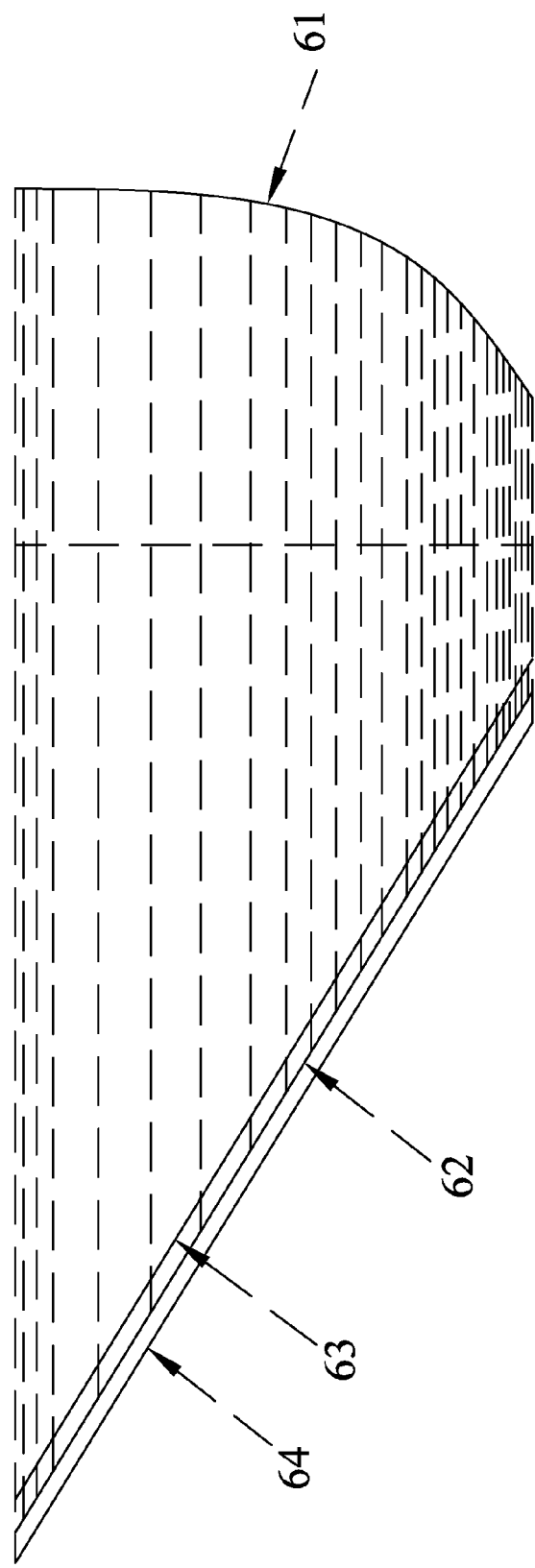
FIG. 6 is a schematic view illustrating the corresponding positions of the front lens barrel module and the rear lens barrel module of the present invention.

Referring to FIG. 6 illustrating the relative positions of the front lens barrel module and the rear lens barrel module of the present invention, the figure shows that the second guide screw cylinder 255 of the rear lens barrel module 25 is designed at a designed position 61, and the zooming fixed screw hole 226 and the fixed screw hole 232 are used to adjust the front lens barrel module 24 to achieve the designed position 62. When the actual position 63 or 64 of the first guide screw cylinder 245 of the front lens barrel module 24 deviates away from the designed position 62, the actual position 63 or 64 of the first guide screw cylinder 245 of the front lens barrel module 24 returns back to the designed position 62 through the adjustment of the zooming fixed screw hole 226 and the fixed screw hole 232, and the clear focusing is obtainable.

Figure 7:
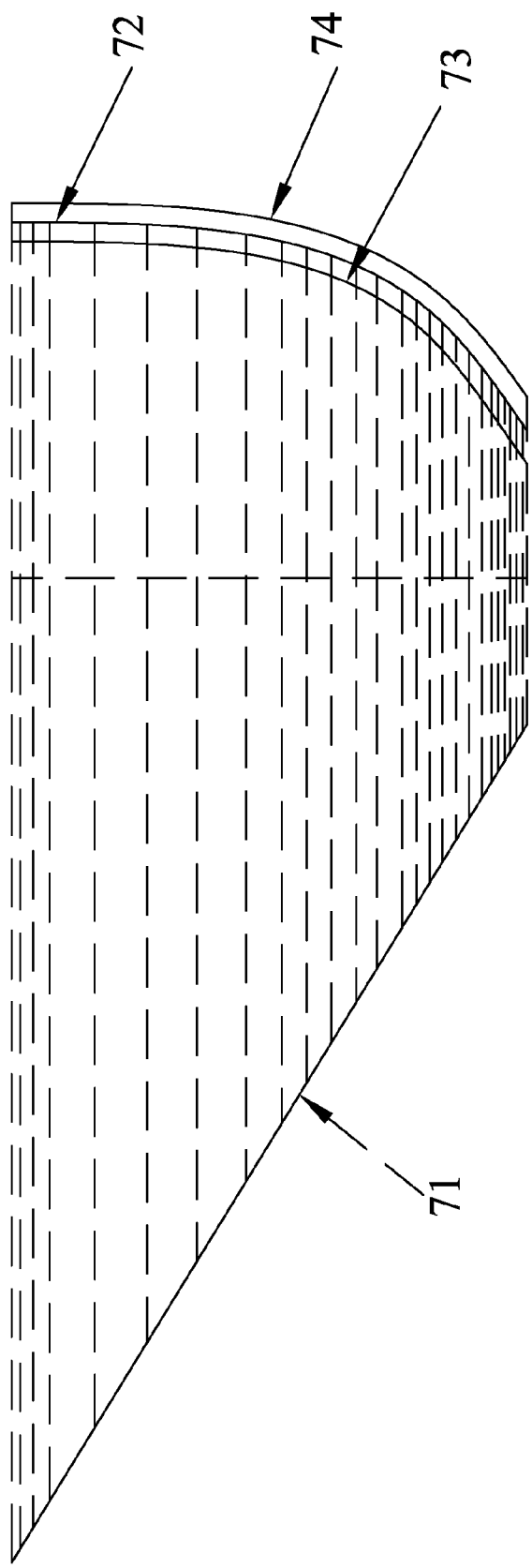
FIG. 7 is a schematic view illustrating the corresponding positions of the front lens barrel module and the rear lens barrel module of the present invention.

Referring to FIG. 7 for a schematic view illustrates the relative positions of the front lens barrel module and the rear lens barrel module of the present invention. The figure shows that the first guide screw cylinder 245 of the front lens barrel module 24 is set at the designed position 71, and the zooming fixed screw hole 226 and the fixed screw hole 232 are used to adjust the rear lens barrel module 25 to achieve the designed position 72. Thus, when the actual position 73 or 74 of the second guide screw cylinder 255 of the rear lens barrel module 25 is deviated away from the designed position 72, the actual position 73 or 74 of the second guide screw cylinder 255 of the rear lens barrel module 25 returns back to the designed position 72 through the adjustment of the zooming fixed screw hole 226 and the fixed screw hole 232 so that clear focusing is obtainable.

In summation of the description above, by using the zooming fixed screw hole 226 and the fixed screw hole 232, when the rear track lens barrel 23 and the front track lens barrel 22 relatively rotate, the relative displacement of the first guide screw cylinder 245 and the front lens barrel module 24 relative to the second guide screw cylinder 255 and the rear lens barrel module 25 can be adjusted. After the front lens barrel module 24 and the rear lens barrel module 25 are adjusted to a clear focusing position, and the screw bolt 26 is used to fasten the zooming fixed screw hole 226 and the fixed screw hole 232. Such design has the function of using the track to adjust the relative position of the front lens barrel module 24 and the rear lens barrel module 25 even if the first guide screw cylinder 245 and the second guide screw cylinder 255 of the front lens barrel module 24 and the rear lens barrel module 25 have slight errors while in manufacture. Therefore, clear focusing is obtainable.

The preferred embodiment described above is recited as an example and is not intended to limit its applications. The invention may be embodied otherwise without departing from such principles, and any modifications or changes made shall also be included in the scope of the invention.

What is claimed is:

1. A zoom lens structure comprising:
    a diaphragm member;
    a fixed lens barrel having a front lens barrel end and a rear lens barrel end, and the front lens barrel end having at least two first guide slots and a diaphragm aperture, and the diaphragm aperture for fastening the diaphragm member, and the rear lens barrel end having at least two second guide slots;
    a front track lens barrel having a barrel body, a driven gear and a rear end ring, and the barrel body having at least two first tracks, and the rear end ring having a zooming fixed screw hole, wherein, by using the driven gear connected to the barrel body and the rear end ring, a diaphragm slot is formed and permits displacement of the diaphragm member in the diaphragm slot;
    a driving motor assembly having a driving motor and a gear wheel, wherein the front track lens barrel rotates through the gear wheel combined to the driving motor driving the driven gear;
    a rear track lens barrel having at least two second tracks and at least two fixed screw holes, and at least two screw bolts for locking the front track lens barrel and the rear track lens barrel through the zooming fixed screw hole and the fixed screw hole so that the front track lens barrel and the rear track lens barrel can move simultaneously;
    a front lens barrel module having a front lens barrel, at least two first guide screw cylinders and a front lens group, and installed inside the front lens barrel end of the fixed lens barrel, wherein the front lens group is moved through the first guide screw cylinder locked to the front lens barrel and the displacement of the first guide screw cylinder within the first guide slot and the first track; and
    a rear lens barrel module having a rear lens barrel, at least two second guide screw cylinders and a rear lens group, and installed inside the rear lens barrel end of the fixed lens barrel, wherein the rear lens group is moved through the second guide screw cylinder locked to the rear lens barrel and the displacement of the second guide screw cylinder within the second guide slot and the second track and thus moves the rear lens group.

2. The zoom lens structure as recited in claim 1, wherein the diaphragm member is an iris diaphragm module with an iris diaphragm and a motor.

3. The zoom lens structure as recited in claim 2, wherein the iris diaphragm has an opening and a plurality of blades that are installed in the opening, and the size of the opening is adjusted through the blades adjusted by the motor.

4. The zoom lens structure as recited in claim 1, wherein the diameter of the front lens barrel end is larger than the diameter of the rear lens barrel end.

5. The zoom lens structure as recited in claim 2, wherein the length of the diaphragm aperture is equal to the width of the iris diaphragm so that the iris diaphragm and the diaphragm aperture do not produce relative displacement.

6. The zoom lens structure as recited in claim 1, wherein the first track surrounds the barrel body.

7. The zoom lens structure as recited in claim 1, wherein the second track surrounds the rear track lens barrel.

8. The zoom lens structure as recited in claim 1, wherein the diaphragm slot is in a major arc shape.

9. The zoom lens structure as recited in claim 1, wherein the driven gear is connected to the diaphragm slot, and is in a minor arc shape.

10. The zoom lens structure as recited in claim 1, wherein the diameter of the rear end ring is smaller than the diameter of the barrel body.

11. The zoom lens structure as recited in claim 1, wherein the zooming fixed screw hole is a long slot so that relative positions is adjusted before locking the front track lens barrel and the rear track lens barrel.

12. The zoom lens structure as recited in claim 1, wherein the front lens barrel module is installed inside the front lens barrel end of the fixed lens barrel.

13. The zoom lens structure as recited in claim 1, wherein the rear lens barrel module is installed in the rear lens barrel end of the fixed lens barrel.

14. The zoom lens structure as recited in claim 1, wherein the front track lens barrel is disposed to the front lens barrel end of the fixed lens barrel.

15. The zoom lens structure as recited in claim 1, wherein the rear track lens barrel is disposed to the rear lens barrel end of the fixed lens barrel.

* * * * *